United States Patent
Shelton et al.

(10) Patent No.: US 10,867,021 B1
(45) Date of Patent: *Dec. 15, 2020

(54) SYSTEMS AND METHODS FOR CONTINUOUS BIOMETRIC AUTHENTICATION

(71) Applicant: United Services Automobile Association (USAA), San Antonio, TX (US)

(72) Inventors: John Shelton, San Antonio, TX (US); Michael Wayne Lester, Fair Oaks Ranch, TX (US); Debra Randall Casillas, Helotes, TX (US); Sudarshan Rangarajan, San Antonio, TX (US); Maland Keith Mortensen, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,619

(22) Filed: Aug. 23, 2019

Related U.S. Application Data

(63) Continuation of application No. 15/993,835, filed on May 31, 2018, now Pat. No. 10,437,975, which is a continuation of application No. 14/489,206, filed on Sep. 17, 2014, now Pat. No. 10,019,561.

(60) Provisional application No. 61/911,773, filed on Dec. 4, 2013.

(51) Int. Cl.
*G06F 7/04* (2006.01)
*G06F 15/16* (2006.01)
*H04L 29/06* (2006.01)
*G06F 21/32* (2013.01)
*G10L 17/24* (2013.01)

(52) U.S. Cl.
CPC .............. *G06F 21/32* (2013.01); *G10L 17/24* (2013.01); *H04L 63/0861* (2013.01); *H04L 63/105* (2013.01)

(58) Field of Classification Search
CPC ......... G06F 21/32; G10L 17/24; G10L 15/26; H04L 63/0861; H04L 9/3231; H04L 63/105
See application file for complete search history.

(56) References Cited

U.S. PATENT DOCUMENTS

| | | |
|---|---|---|
| 5,664,058 A | 9/1997 | Vysotsky |
| 5,666,400 A | 9/1997 | McAllister et al. |
| 7,039,951 B1 * | 5/2006 | Chaudhari .............. G10L 17/06 340/5.84 |
| 8,543,834 B1 | 9/2013 | Barra |
| 8,838,985 B1 | 9/2014 | Robbins |

(Continued)

*Primary Examiner* — Trong H Nguyen
(74) *Attorney, Agent, or Firm* — Fish & Richardson P.C.

(57) ABSTRACT

Methods and systems for authenticating a user are described. In some embodiments, a series of voice interactions are received from a user during a voiceline session. Each of the voice interactions in the series of voice interaction may be analyzed as each of the voice interactions are received. A confidence level in a verification of an identity of the user may be determined based on the analysis of each of the voice interactions. An access level for the user may be automatically updated based on the confidence level of the verification of the identity of the user after each of the voice interactions is received.

21 Claims, 7 Drawing Sheets

(56) References Cited

U.S. PATENT DOCUMENTS

| | | | |
|---|---|---|---|
| 8,856,541 B1* | 10/2014 | Chaudhury | G06F 21/32 |
| | | | 713/186 |
| 9,032,498 B1 | 5/2015 | Ben Ayed | |
| 10,019,561 B1 | 7/2018 | Shelton et al. | |
| 2003/0046072 A1* | 3/2003 | Ramaswamy | G06F 40/56 |
| | | | 704/240 |
| 2007/0055517 A1 | 3/2007 | Spector | |
| 2007/0143117 A1 | 6/2007 | Conley | |
| 2008/0127296 A1* | 5/2008 | Carroll | G06F 21/33 |
| | | | 726/1 |
| 2008/0195389 A1 | 8/2008 | Zhang | |
| 2008/0243501 A1 | 10/2008 | Hafsteinsson | |
| 2010/0115610 A1 | 5/2010 | Tredoux et al. | |
| 2010/0158207 A1 | 6/2010 | Dhawan et al. | |
| 2012/0249328 A1 | 10/2012 | Xiong | |
| 2013/0097682 A1 | 4/2013 | Zelijkovic et al. | |
| 2013/0132091 A1 | 5/2013 | Skerpac | |
| 2013/0247165 A1 | 9/2013 | Pal | |
| 2014/0037074 A1 | 2/2014 | Bravo et al. | |
| 2014/0289833 A1 | 9/2014 | Briceno et al. | |
| 2015/0081295 A1* | 3/2015 | Yun | G10L 17/04 |
| | | | 704/236 |
| 2015/0339671 A1* | 11/2015 | Krietzman | G06Q 20/405 |
| | | | 705/44 |

* cited by examiner

SYSTEMS AND METHODS FOR CONTINUOUS BIOMETRIC AUTHENTICATION

CROSS-REFERENCE TO RELATED APPLICATIONS

This application is a continuation application of and claims priority to U.S. application Ser. No. 15/993,835, filed May 31, 2018, which is a continuation of and claims priority to U.S. application Ser. No. 14/489,206, filed on Sep. 17, 2014, now U.S. Pat. No. 10,019,561, which is a non-provisional of and claims priority to U.S. Provisional Application No. 61/911,773, filed on Dec. 4, 2013, entitled "SYSTEMS AND METHODS FOR AUTHENTICATION USING VOICE BIOMETRICS AND DEVICE VERIFICATION," which are hereby incorporated by reference in their entirety for all purposes.

TECHNICAL FIELD

Various embodiments of the present disclosure generally relate to authentication. More specifically, various embodiments of the present disclosure relate to methods and systems for continuous biometric authentication.

BACKGROUND

The protection and security of customer information is vital from an organization's perspective, not only to comply with applicable laws, but to earn and keep customer's trust. Enhanced security often comes at the cost of convenience for the user. For example, authentication generally requires two steps: first, identifying the customer, and second, verifying the customer's identity. To identify the user, the organization may recognize a device being used to contact the organization or the user may provide a username, a member number, or other identifying information. To verify the customer's identity, the customer may be required to answer additional security questions, provide a PIN, secret code, or other information.

BRIEF DESCRIPTION OF THE DRAWINGS

Embodiments of the present disclosure will be described and explained through the use of the accompanying drawings in which.

Figure 1:
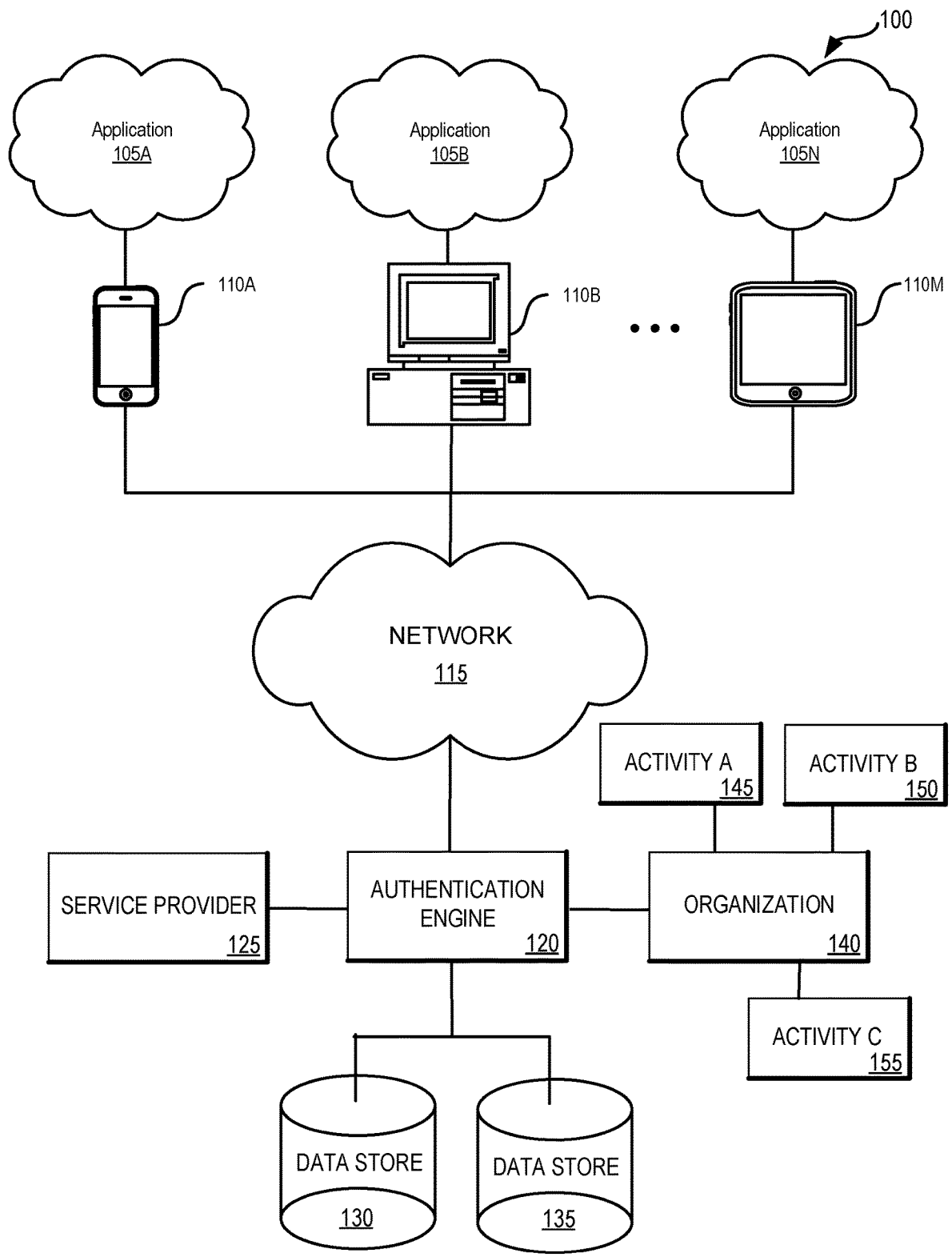
FIG. 1 illustrates an example of a network-based operating environment in accordance with various embodiments of the disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to authentication. More specifically, various embodiments of the present disclosure relate to methods and systems for authentication using continuous biometric authentication.

Security and data protection are becoming increasingly important. Unfortunately, customers and other users may become annoyed with extra steps or additional information required for authentication. In existing systems, the users are required to provide information to identify the user (e.g., a username) and additional information to verify the user's identity (e.g., an answer to a security question). If the user's identity can be verified to a certain level, then the user is permitted to take part in at least some activities. If the user desires to partake in additional activities, and particularly activities with higher security requirements, the user may be required to provide additional authenticating information.

In contrast to these traditional systems, the systems and methods described herein provides a variety of technological solutions that reduce or remove the burden of requesting and receiving additional authentication information. In some embodiments, the systems and methods described herein naturally exploit interactions with the user to adjust the authentication or access level of the user throughout a session. As a result, the user can be passively authenticated, possibly over and over, through the user's natural interactions or through information that is passively collected and verified without interrupting the natural flow of the interactions between the user and the system. In this way, security may be increased without sacrificing convenience for the user.

Users may interact with an organization via channels during one or more sessions. A session may be an interactive exchange defined by a beginning interaction, such as a request for an interaction, the interaction, and termination of the interaction. In some embodiments, sessions between the user and the organization may be contiguous time periods of interaction or related interactions that occur over a series of distinct time periods. In another example, a session may be a phone call, which begins with a user calling the organization and ends when the call is terminated. One or more activities may take place during a single session. For example, a mobile application account session may begin with the user logging in using a username/password, completing several activities, such as checking an account balance, ordering a new credit card, and transferring funds, and ending the session by logging out. A session may take place through a single channel. In some embodiments, a session may include interactions over multiple channels by porting a session from one channel, such as a mobile application, onto a second channel, such as a voice and data call.

In some embodiments, a user can be authenticated with information the user naturally provides (e.g., that is passively collected) without realizing that such information is being used or provided. For example, a user's voice or eye movements while communicating with an organization can be collected, evaluated, and used as authentication information to either identify a user or verify a user's identity. Additionally, such information can be continuously collected during a session to continuously identify the user or verify the user's identity. In some embodiments, a confidence in the user's identity or verification of the user's identity may vary as the user interacts with the organization resulting in different confidence levels throughout the user's session with the organization. Thus, the user may be continuously authenticated to higher levels without being required to provide any additional authentication information.

In an example, the user may call into the organization using a registered device. The device may be used to identify the user (e.g., phone number of the device may be associated with a profile of the user). Once the user is identified, the user's identity may be verified using biometrics. The user may have previously provided biometric samples to the organization. In some embodiments, the user may have intentionally provided samples during a registration process. In other embodiments, the user may have provided samples simply by interacting with the organization.

If voice biometrics are used to verify the identity of the user, an analysis of the user's speech while interacting with an interactive voice response system (IVR) or representative may be analyzed and compared to previously analyzed samples of the user's speech. For example, the user may state a command such as "check account balance." The spoken command may be processed both to determine an intent of the command and to verify the identity of the user. A confidence level in the verification of the user's identity may be determined. As the user continues to interact with the IVR or representative during the session, more data from the natural course of the interaction may be collected and analyzed to determine an updated confidence level in the user's identity or verification of the user's identity. The updated confidence level can provide a greater level of user access during the session without requiring the user to provide information for the access.

Once the user's identity is verified to a certain confidence level, the user may be authenticated or admitted to the mobile application, website, electronic safe, room, or other medium or allowed to partake in an activity such as viewing account data, trading stocks, or transferring funds. In some embodiments, when the user's voice or other biometric information cannot be matched to the degree necessary to perform a desired activity, the user may be asked to provide (by speaking or keying in) additional authenticating information such as a personal identification number, member number, a video stream, etc. In some embodiments, additional biometric information such as a retinal scan may be collected and used to verify the user's identity. In yet other embodiments the user may be asked to share GPS, video, take a photo, etc.

Two types of authenticating voice biometrics may be used during authentication: text-dependent authentication and text-independent authentication. In text-dependent authentication, a user has previously stated a specific phrase or portions of a specific phrase in an enrollment process. The previously captured spoken phrase is then used to authenticate the user by comparing the voice biometrics of the previously spoken phrase to the voice biometrics of the current phrase. Text-independent authentication does not require that the user has previously spoken a particular phrase but does require previous spoken interactions with the user be recorded and analyzed (e.g., a voice fingerprint of the user's voice that includes unique attributes and characteristics of the user's voice can be created). Text-dependent authentication currently results in a lower false positive identification rate. Additionally, text-dependent authentication requires less spoken text for successful identification. However, the challenge with using text-dependent authentication is that the user is required to have previously spoken the phrase to the authenticating entity. In some embodiments, this may result in the user speaking the same words over and over and potentially giving away important information such as a personal identification number.

In some embodiments, during a conversation, a user speaks morphemes, words, phrases, clauses, sentences, numbers, etc. (e.g., one, two, three, check status, account, etc.) that can be combined in numerous ways such that the user can be authenticated using those words without having to state the same morphemes, words, phrases, clauses, sentences, numbers, etc. over and over to create several samples of the user stating the morphemes, words, phrases, clauses, sentences, numbers, etc.

The combination of words may be of a fixed length, a variable length, may span the entire word space, and/or only be a subset thereof. The previously recorded samples of the person saying these words may be used to create a voice profile that can be used to determine a confidence level in the verification of the user's identity. For example, the recorded samples may be directly compared with the current version of the person stating the words. A closeness of the match may determine or be used in the confidence of the verification of the identity of the user. As another example, the recorded samples may be indirectly used by creating a voice profile. As a result, even words, phrases, or numbers not previously recorded but that are currently spoken can be evaluated to determine a confidence level.

In an example, over time, the user can state a phrase such as "check status of automobile claim" several times to the authenticating entity. An analysis of how of the user speaks "check status" may be used to develop a voice profile of how the user typically speaks "check status." Thus, in the future, the authenticating entity may use text-dependent voice recognition to authenticate the user using voice biometrics for any command that includes the words "check status."

Voice biometrics are specifically discussed in many examples in the description, but these examples are not meant to be limiting. Rather, other types of biometric information and multiple additional factors may be used to authenticate the user. For example, the system may record a video of the user making a spoken request. Then, in addition to voice biometrics and token authentication, facial recognition can be used as part of a multi-factor, continuous authentication.

In the following description, for the purposes of explanation, numerous specific details are set forth in order to provide a thorough understanding of embodiments of the present disclosure. It will be apparent upon reading the disclosure, however, to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable media suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device, a mobile phone, a tablet computer, a mobile media device, a mobile gaming device, a vehicle-based computer, a dedicated terminal, a public terminal, desktop, or laptop computer, a kiosk, etc.). In some embodiments, applications 105A-105N may be stored on the computing device or may be stored remotely. These computing devices can include mechanisms for receiving and sending traffic by connecting through network 115 to authentication engine 120, service provider 125, and data stores 130 and 135.

Computing devices 110A-110M may be configured to communicate via the network 115 with authentication engine 120 and service provider 125. In some embodiments, computing devices 110A-110M can retrieve or submit information to authentication engine 120 and run one or more applications with customized content retrieved by authentication engine 120, service provider 125, and data stores 130 and 135. For example, computing devices 110A-110M can execute a browser application or a customized client to enable interaction between the computing devices 110A-110M and authentication engine 120, service provider 125, and data stores 130 and 135.

Network 115 can include any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (I psec).

Authentication engine 120 can be running on one or more servers and can be used to authenticate users to a mobile application, website, to perform a specific activity, or for other activities. Authentication engine 120 may be communicably coupled with service provider 125, data stores 130 and 135, organization 140, and computing devices 110A-110M, and may communicate, access or receive data (e.g., tokens, verification information, voice authentication services, etc.) from computing devices 110A-110M, service provider 125, and data stores 130 and 135.

Authentication engine 120 may be associated with organization 140, and the users may be members or potential members of the organization. The organization may be a financial institution and/or an insurance company. A user may access organization 140 to perform activities such as activity A 145, activity B 150, activity C 155. Activities such as activity A, activity B, and activity C may include viewing an account, transferring funds, filing an insurance claim, for example.

Authentication may be based on information received through various user interfaces running on computing devices 110A-110M, service provider 125, or other interactions, communications, and/or other inputs (e.g., emails, tokens, and/or communications via other channels). Authentication engine 120 can be calibrated/configured by individual companies or service providers based on risk tolerance and/or other business objectives to authenticate users.

In some cases, authentication to the application, process, website, or activity may be based on different criteria. For example, in addition to rendering an authentication decision, authentication engine 120 may be configured to compute a risk profile or score. That profile may be used by itself to make a decision, or it may be used in conjunction with other profiles, scores, and/or business practices. Authentication engine 120 may also be configured to recommend an access level the user should be granted based on a confidence in the user's identity or a verification of the user's identity. In some embodiments, authentication engine 120 includes various data processing and analytic tools that allow for implementation, creation, and evaluation of users and user information retrieved from data stores 130 and 135.

Service provider 125 may be a natural language processor, security service provider, voice verification analyzer, or other entity that may analyze, process, or provide information for authenticating users. Service provider 125 may translate speech into text and/or determine an intent of a request or command. In some embodiments, service provider 125 may communicate with computing device 110A-110M and authentication engine 120 to determine an access level of the user.

The data stores 130 and 135 can be used to manage storage and access to user data such as registered user devices, user identifications, voice profiles, token IDs, financial information, authentication history, user preferences, member identification numbers, device fingerprints, personal identification numbers, and other information. Data stores 130 and 135 may be a data repository of a set of integrated objects that are modeled using classes defined in database schemas. Data store may further include flat files that can store data. Authentication engine 120 and/or other servers may collect and/or access data from the data stores 130 and 135.

Figure 2:
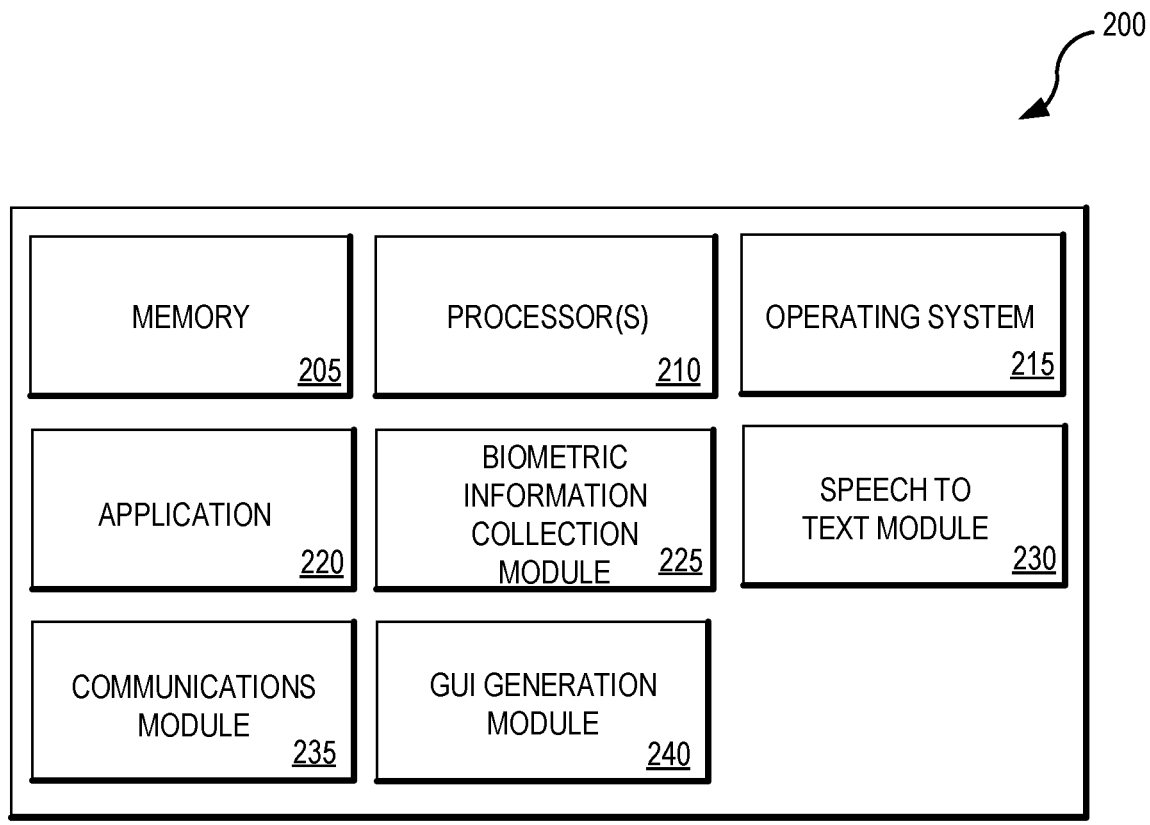
FIG. 2 illustrates various components of a computing device that may be used in accordance with one or more embodiments of the disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, biometric information collection module 225, speech to text module 230, communications module 235, and graphical user interface (GUI) generation module 240. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, biometric information collection module 225 and speech to text module 230 can be combined into a single component.

Memory 205 can be any device, mechanism, or populated data structure used for storing information. In accordance with some embodiments of the present disclosure, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, biometric information collection module 225, speech to text module 230, communications module 235, and GUI generation module 240.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with authentication engine 120. For example, application 220 can include a banking application, a money transfer application, a social networking application, a gaming application, and the like.

Application 220 can access a server associated with an organization (e.g., authentication engine 120) to retrieve account details or perform other activities. However, before allowing access, a user of application 220 needs to be authenticated. Traditionally, the authentication process has been cumbersome, requiring a username and password and/or PIN be entered by the user. In contrast, various embodiments provide for a PIN-less and password-less authentication scheme or process that uses information already being provided by the user to authenticate the user. Additionally, as the user continues the interaction, application 220 and/or authentication engine 120 can continually calculate a confidence level in the user's identity of a verification of the user's identity.

For example, according to some embodiments, when a user launches application 220, the user may speak a command, such as "check status of insurance claim." The user may be identified by information from the user's device such as a phone number, device ID, and/or IP address. The user's identity may be verified using biometric information or other information collected passively (i.e., without requesting that the user provide authenticating information). A confidence in the verification may be calculated, which can be used to determine an access level of the user. The confidence in the verification may take many forms including discrete levels (e.g., high, medium, and low), continuous levels (e.g., a score from 1 to 100), a multi-categorical level (e.g., speech with a discrete level of medium, fingerprint with a continuous level of 78, total information amount with a discrete level of low, etc.), a time-based level (e.g., the lowest level within the past 1 minute) or other form. The access level may be changed as the confidence is recalculated with additional information during the user's interaction.

Biometric information collection module 225 may collect biometric samples from a user, such as the user's voice speaking the command, to verify the user. Other types of biometric information collected may include eye movement, a retinal scan, behavioral biometrics (e.g., characteristics of how the user types such as pressure on the keyboard and time between typing movements), and other biometric information. The biometric sample may be used by the authentication engine 120 and/or service provider 125 to authenticate the user. Biometric information collection module 225 may collect biometric information continuously throughout the user's session with the organization, providing for a dynamic authentication process.

When the biometric information collected by biometric information collection module 225 is speech, speech to text module 230 may translate the user's speech into text. In some embodiments, translated speech is communicated to the organization in addition to or instead of the user's speech.

Communications module 235 can send and receive requests, approvals, and information to and from authentication engine 120 and service provider 125. For example, communications module 235 may receive a communication that the user's identity has been verified to a certain confidence level and that the user is authorized to a certain access level. Alternatively, communications module 235 may receive a communication that the user's identity could not be verified to a required level and that the user needs to provide additional credentials such as a PIN, password, picture, video, another voice sample, or other authenticating information. The information may include a token, token ID, device fingerprint, biometric samples, username/password, PINs, and other information.

GUI generation module 240 can generate one or more GUI screens that allow for interaction with a user. In at least one embodiment, GUI generation module 240 generates a graphical user interface receiving and/or conveying information to the user. For example, the GUI generation module 240 may display an access level that the user has achieved. The displayed access level may change as the user continues to interact with the organization.

Figure 3:
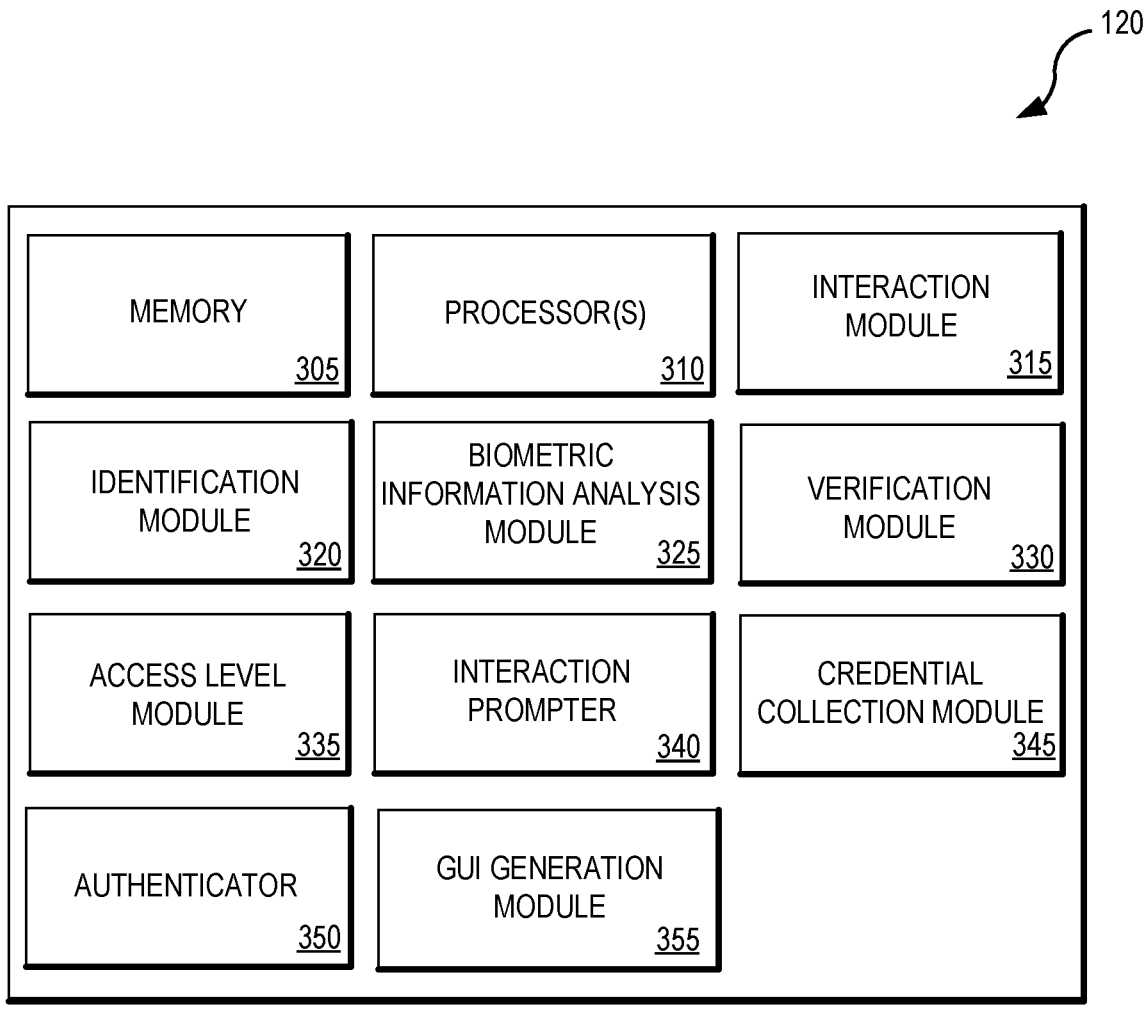
FIG. 3 illustrates various components of an authentication engine that may be used in accordance with various embodiments of the present disclosure.

FIG. 3 illustrates a set of components within authentication engine 120 according to one or more embodiments of the present disclosure. According to the embodiments shown in FIG. 3, authentication engine 120 can include memory 305, one or more processors 310, interaction module 315, identification module 320, biometric information analysis module 325, verification module 330, access level module 335, interaction prompter 340, credential collection module 345, authenticator 350, and GUI generation module 355. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of interaction module 315, identification module 320, biometric information analysis module 325, verification module 330, access level module 335, interaction prompter 340, credential collection module 345, authenticator 350, and GUI generation module 355.

Interaction module 315 receives interactions from a user or user device such as computing device 110 and processes the interactions. Interaction module 315 may receive interactions via a phone line or other electronic communication media (i.e., channels). For example, the electronic communication containing the interaction can be sent via text message, email, internet relay chat (IRC), file transfer protocol (FTP), hypertext transfer protocol (http), hypertext transfer protocol secure (https), or transmission control protocol/internet protocol (TCP/IP), among others.

Interactions may include voice interactions, keyboard interactions, video interactions, etc. Voice interactions can include conversations, requests, and/or commands made between a user and an IVR or representative and may be received in a series. Interaction module 315 may process the interaction. Processing an interaction may include determining an intent or meaning of the interaction. In some embodiments, the determination may be made at least in part by translating the speech into text. Determining an intent of an interaction may be done on a per-user basis based on previous interactions collected from the user. For example, the user may indicate a desire to check a status of an automobile insurance claim by stating "vehicle claim." Interaction module 315 may translate this command into an actionable instruction (e.g., display or read status of automobile insurance claim for member number 00000"). In some embodiments, some or all of the processing of the interaction may be outsourced to a service provider.

Identification module 320 may identify the user and/or a device of the user. For example, a device being used to contact the organization may be associated with a user ID, member profile, etc., thus identifying the user. Devices may be identified or verified by a device identifier or other device information such as a token, phone number, secure browsing solution, embedded code, or a device fingerprint based on characteristics of the hardware and/or software. In some embodiments, the user may be identified by facial recognition if a video chat or other video conferencing means are used. In some embodiments, the user may be identified by the user's voice. Identification module 320 may identify two possible users based on the device. For example, a phone number of a device may be registered to two members (e.g., a husband and a wife). Biometric information analysis module 325 may analyze biometric information to determine the identity of the caller in such situations.

Biometric information analysis module 325 can analyze biometric information (e.g., voice, speech, eye movements, behavioral biometrics, etc.) received by interaction module 315. Analyzing the biometric information may include generating, extracting, or determining characteristics of the biometric information; creating a biometric profile; and/or developing a biometric fingerprint. In some embodiments, voice biometrics are analyzed. Characteristics of a voice sample may include intonation, pitch, cadence of speech, and tone. When a command, request, or other voice interaction is received, biometric information analysis module 325 can extract the characteristics of the voice speaking the command, request or other voice interaction. The characteristics extracted from the command, request, or other voice interaction are compared with the characteristics of the user's voice from earlier interactions with the user and used by verification module 330 in verifying the caller's identity.

In some embodiments, text-dependent speech recognition is used. As discussed above, when using text-dependent speech recognition, certain words or phrases are analyzed and compared to an analysis of previously collected samples of those particular words and phrases. The speech may be translated into text by speech to text module 230 and/or interaction module 315. In some embodiments, biometric information analysis module 325 can identify words or phrases that the user speaks on a regular basis and use such words or phrases as text-dependent words or phrases to verify the user during future interactions. Biometric information analysis module 325 may continuously evaluate biometric information during a session and communicate the results to verification module 330.

Verification module 330 verifies an identity of the user by comparing an analysis of the interactions with previously analyzed interactions from the user. Types of biometric samples may include voice, eye movements, and behavioral biometrics, for example. The type of analysis used to compare the samples depends on the type or types of biometrics being used to authenticate the user. For example, if voice biometrics are used to verify the user, characteristics of the voice (e.g., pitch, attenuation, accent, speed, etc.) extracted from the current sample may be compared with the characteristics of the user's voice in previously recorded samples.

Verification module 330 may receive analyzed biometric information from biometric information analysis module 325 and compute a score or other indication of a confidence level of the verification. For example, when the biometric samples collected by interaction module 315 match the biometric samples previously collected by interaction module 315 at or above a certain threshold, the confidence in a verification of the user's identity user may indicate a high confidence level. The confidence level may be used by access level module 335 to determine an access level of the user (e.g., the higher the confidence level, the higher the access level for the user). The access level may be the level of access granted to the user (e.g., the higher the access level of the user, the more activities the user can partake in).

The following illustrates how a verification process may be conducted. A user calls the organization on a registered device and engages in a series of voice interactions with a representative. The user may be identified by stating the user's member number, providing information via a registered device, or other methods of identifying a user.

Next, the user may state that the user is calling in regards to "automobile insurance." A voice analysis may be conducted on the user's speech of "automobile insurance" and compared with previously analyzed samples of the user's speech. Speech recognition may be text dependent or text independent, depending on a number factors, such as whether the organization has a previous sample of the user speaking the words and how accurate the verification needs to be. Thus, if the user has previously stated "automobile insurance" and characteristics of the user speaking this phrase have been generated, then the verification of the user's identity could use text-dependent speech recognition. A confidence level in the verification of the user may be computed based on the results of the comparison of the first interaction.

The results of the comparison of the first interaction may show a low confidence level in the verification of the user's identity for many reasons. For example, the user could be speaking unclearly, the user may have an illness that distorts his/her voice, or the user may not be the person the user purports to be. However, additional interactions during the session may be analyzed to verify the user's identity, which may raise or lower a confidence level. For example, in the following interactions during the session, the user may state the user's name for the representative. The user's speech of the user's name may be analyzed and compared with previously analyzed samples of the user speaking his or her name and a new confidence level may be determined with the additional sample.

The confidence level can include results from only the current sample or the confidence level can be inclusive of the entire series of interactions in the session up to the current interaction in the session (e.g., averaged). When computing the confidence level using the latter method, if the combined confidence from the first several interactions in the series is low (e.g., 2 on a scale of 1-10), then the verification must score a high confidence level in the next several interactions for the user to receive access to view any information or to participate in any activities. In some embodiments, the interactions may be weighted such that some interactions are more influential on the overall confidence level. For example, an analysis of the user speaking the user's member number may be given more weight than an analysis of the user stating the general purpose of the call since the user has likely stated the user's member number during previous interactions, resulting in a more accurate voice analysis. The various weightings may vary by industry, business, organization, user, or business unit.

In some embodiments, processing of the request or speech to determine an intent of the request or speech and the verification of the user's identity are accomplished simultaneously or nearly simultaneously. In other embodiments, the user's speech is verified after the processing of the request is complete. In some embodiments, other factors are scored and influence the confidence level. For example, the user could share video with the representative. Biometrics of an image of the user's face may be analyzed and factored into the confidence level. In some embodiments, the confidence in the verification of the user's identity may be scored differently depending on the user. For example, if the user has recently reported identity theft, a confidence level in the user's identity may begin lower or it may take several interactions for the user to establish the required confidence. Each time a confidence level is calculated or updated, the results may be communicated to access level module 335.

Access level module 335 determines an access level for the user based on the received confidence level. Access level module 335 further determines an access level required for a particular activity. Access levels may be a number in a range of numbers (e.g., 1-100) where access is increased as the access level is increased. Access levels may be implemented by a set of rules that are determined by the organization, government regulations, or other entity. The access levels may be based on a risk or perceived risk of an activity, user, or situation. For example, viewing an accounts page may require a low access level (e.g., 2 on a scale of 1-100) whereas transferring funds to an account outside of the organization may require a high access level (e.g., 83 on the scale of 1-100).

If the access level for the user meets the access level necessary for activity, the user is granted access. In some embodiments, the access level of the activity varies by user (instead of varying by the confidence level). For example, if the user has reported a stolen identity or fraudulent uses of the user's credit card, the access level may be increased for certain activities for that particular user. In other embodiments, if the user is demonstrating a pattern of activities consistent with typical activities for the user (e.g., the user wires money from a base station overseas on the second Friday of each month), then the access level required for the activity may be lower for the user than for other users. Alternatively, the confidence level in the user's identity could be adjusted.

The access level for the user may be used in granting or denying access to an application, website, activity, etc. In some embodiments, the access level is used in granting or denying access to a restricted command. Examples of restricted commands include a command to log a person in to an account, a command to cause a transfer of funds from one account to a second account, and a command accessing restricted data, among others. Examples of accounts that a login command may log a user in to include a social media account, an account at a financial institution, an account at a bank, an account at a credit union, an account at a merchant, an account at a service provider, or an account at a rental provider, among others.

Interaction prompter 340 may detect that the access level for the user has not reached the appropriate level and may collect additional information and/or prompt the user for additional information (e.g., biometric information, device information, etc.) in a passive manner. By collecting the information in a passive manner, the user may be unaware that identifying information is being collected.

For example, if the user has asked to transfer funds but the confidence level is not high enough to grant the user the necessary access level, then the user could be engaged in conversation or asked questions. The answers to the questions may be unrelated to verifying the user's identity but the user's voice may be analyzed to verify the user's identity. For example, the representative may say, "Sure, I can help you with the funds transfer. It will be just a minute while I bring your account up. What is the weather like in your area today?" In some embodiments, the user could be asked to look at a certain document that is being displayed on the screen if eye scans are being used to identify the user. The additional interaction information may be analyzed by biometric information analysis module 325 and used in verifying the user's identity by verification module 330. In some embodiments, the user may be asked to type the user's name or PIN or other sentence to analyze the way that the user types. The information that the user is typing may be irrelevant to verifying the user's identity.

The type additional engagement or information collected may be selected based on historical successes or failures of the user, user preferences, device preferences, device characteristics, current interactions, channel the user is using to interact with the organization, etc. For example, additional device verification may include verifying the device's IP address if the user is accessing the organization via a computing device. Prompts for additional information may include conversational prompts to analyze voice, display prompts to analyze eye movement, and typing prompts (e.g., instruction to type a PIN) to analyze typing behavior.

Credential collection module 345 may detect that the confidence level has not reached the appropriate level and may prompt the user for additional information in an active or passive manner. By collecting the information in an active manner, the user is made aware that credentials are being collected. In an example of collecting the information in an active manner, credential collection module 345 may ask the user to verify the user's address, middle name, or birthdate. If the user provides the necessary credentials, the confidence level in the verification of the identity of the user may be raised and the access level of the user may be raised, allowing the user to participate in additional, more risky activities.

In some embodiments, credential collection module 345 may attempt to authenticate the user passively, such as by attempting to geolocate the user using cell phone triangulation or other methods. If the user is in an expected location, the user may be authenticated even if the biometric authentication was unsuccessful. In some embodiments, a sliding scale may be used to determine if additional passive authentication is appropriate. For example, if the verification of the user's identity results in an access level that is close to what is needed for the user to participate in a requested activity, then the supplemental passive authentication may be used to authenticate the user. On the other hand, if the biometric match was not close, then the user may be denied the authentication request and/or asked for more intrusive information such as a social security number.

Authenticator 350 can authenticate the user when the access level of the user meets or exceeds the access level of the requested activity. In some embodiments, if the access level of the user does not meet or exceed the access level of the requested activity, interaction prompter 340 or credential collection module 345 may prompt the user for additional information.

GUI generation module 355 is similar to GUI generation module 240. GUI generation module 355 can generate one or more GUI screens that allow for interaction with a user of the authentication engine 120. In at least one embodiment, GUI generation module 355 generates a graphical user interface allowing a user of the mobile device to set preferences, authentication standards, rules, constraints, customize messages, and/or otherwise receive or convey information to the user.

Figure 4:
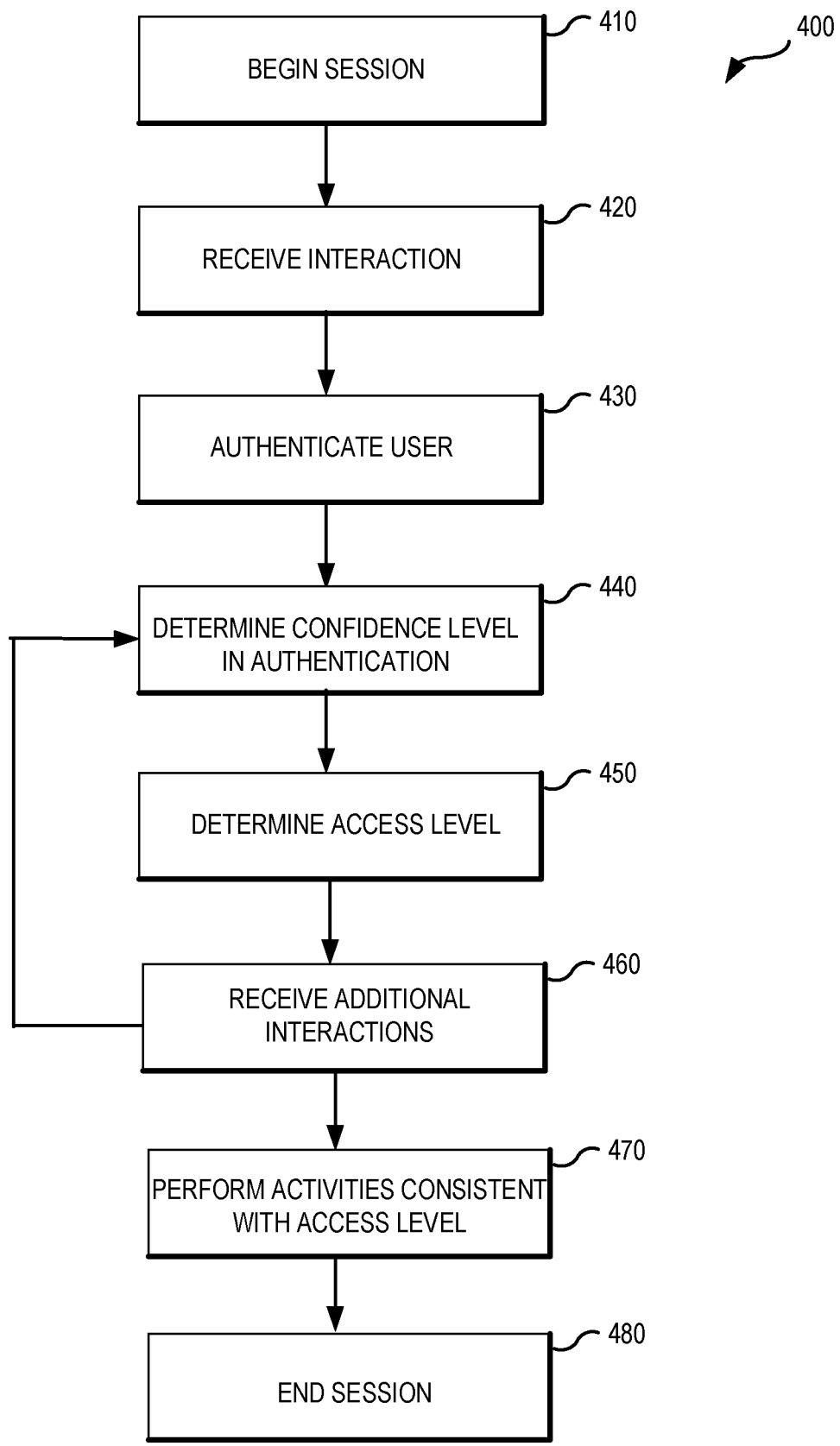
FIG. 4 is a diagram illustrating a process for continuous biometric authentication in accordance with some embodiments of the present disclosure.

FIG. 4 is a diagram illustrating a process 400 for continuous biometric authentication in accordance with some embodiments of the present disclosure. The operations illustrated in FIG. 4 may be performed by one or more components, devices, or modules such as, but not limited to, computing devices 110A-110M, authentication engine 120, processor 310, interaction module 315, identification module 320, biometric information analysis module 325, verification module 330, access level module 335, interaction prompter 340, credential collection module 345, authenticator 350, and GUI generation module 355, or other components or devices. In some embodiments, fewer than all of the steps are performed, whereas in other embodiments additional operations are performed. Moreover, in some embodiments, the operations may be performed in different orders.

Beginning session operation 410 begins a session when an interaction from a user is received. An interaction may occur via a telephone, mobile device, laptop computer desktop computer, etc. and may be made via a mobile application, website portal, chat, instant message, SMS messaging, etc. Receiving operation 420 receives the interaction that begins the session and interactions made throughout the session. For example, each request, command, answer, eye movement, typed message, etc. can be considered an interaction during the session.

Authenticating operation 430 first identifies the user (e.g., by identifying a device, receiving information, etc.) and verifies the identity of the user (e.g., receiving answers to a security question, analyzing biometric information, etc.). Determining confidence level operation 440 determines a confidence level in the authentication of the user. The confidence level may be calculated based on numerous factors such as a type and source of data used to verify and/or identify the user, a match of previously analyzed biometric data with an analysis of currently collected biometric data, historic behavior of the user, difficulty of challenge questions, and recent changes made to the user's account.

The confidence level may be computed by applying a weight to each category of data, categorizing the data, determining a confidence score for each piece of data based on the factors, multiplying the confidence score by the weighting that should be applied to the data, and summing the confidence scores to determine an overall confidence level in the authentication of the user.

Determining operation 450 determines the access level of the user and the access level required for activities. In some embodiments the access level of the user may be based solely on the confidence level in the authentication of the user. For example, if the confidence level of the authentication in the user is a mid-range score (e.g., 300), the access level assigned to the user at that point in time may be access level 3. Thus, the user may participate in any activities with an access level of 3 or less. In some embodiments, the user's access level may further be based on the type of information collected. For example, to partake in certain activities, the user may be required to have provided certain information regardless of the confidence level in the user.

Receiving operation 460 receives additional interactions in the course of the session with the user. The interactions are analyzed to determine a dynamic confidence level and access level for the user. In some embodiments, regardless of whether additional requests are being made, the access level of the user is being continually updated based on the confidence level that the user is who the user claims to be. In some cases, the access level may go down during the series of interactions and later go back up, depending on the information gleaned from the interaction or other information collected during the session (e.g., location information).

Performing operation 470 performs requested activities consistent with the access level. For example, if the user requests an account summary and the user has the required access level, the information can be provided to the user. End session operation 480 ends the session with the user. In some embodiments, a log of the confidence levels and access levels are stored.

Figure 5:
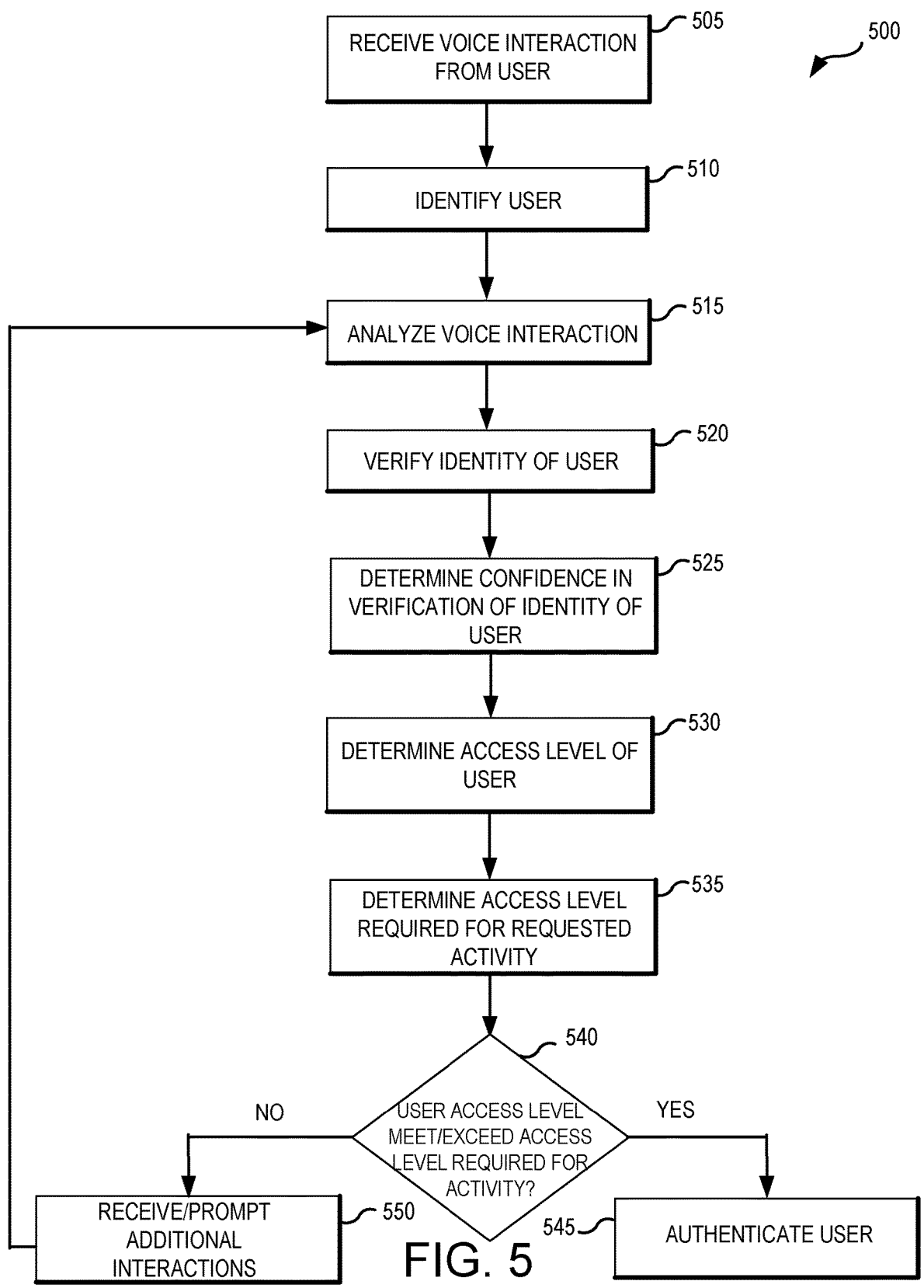
FIG. 5 is a diagram illustrating a process for continuous biometric authentication in accordance with some embodiments of the present disclosure.

FIG. 5 is a diagram illustrating a process 500 for continuous biometric authentication in accordance with some embodiments of the present disclosure. The operations illustrated in FIG. 5 may be performed by one or more components, devices, or modules such as, but not limited to, computing devices 110A-110M, authentication engine 120, processor 210, operating system 215, application 220, biometric information collection module 225, speech to text module 230, communications module 235, GUI generation module 240, processors 310, interaction module 315, identification module 320, biometric information analysis module 325, verification module 330, access level module 335, interaction prompter 340, credential collection module 345, authenticator 350, and GUI generation module 355, or other components or devices. In some embodiments, fewer than all of the steps are performed, whereas in other embodiments additional operations are performed. Moreover, in some embodiments, the operations may be performed in different orders.

Receiving operation 505 receives a voice interaction from the user. The voice interaction could be received from a mobile device, a landline, etc. Identifying operation 510 identifies the user. The user may be identified from information gathered from the user or the user device (e.g., username, member number, device fingerprint, phone number, secure browsing solution, etc.). Analyzing voice interaction operation 515 analyzes the voice interaction. In some embodiments, analyzing the voice interaction includes determining the characteristics of the user's voice (e.g., intonation, pitch, tone, cadence, etc.). After identifying the user, verifying operation 520 verifies the identity of the user by comparing the characteristics of the user's voice to characteristics of the user's voice derived from previous samples of the user's voice. In some embodiments, the user is verified if the comparison meets or exceeds a certain threshold.

Determining confidence operation 525 determines a confidence in the verification of the identity of the user. In some embodiments, the confidence is determined based on many factors, including the analysis of the voice interactions. For example, the voice comparison may not yield favorable results for a match, but a positive fingerprint read could boost the confidence level. Determining user access level operation 530 determines the access level of the user based on the confidence level of the verification. Thus, an access level of the user is determined based on how certain the organization is that the user is who the user claims to be.

Determining activity access level operation 535 determines an access level required for a requested activity. Decision operation 540 determines whether the user access level meets or exceeds the access level required for an activity. Upon determining that the user access level meets or exceeds the access level required for the activity, authenticating operation 545 authenticates the user and performs the activity. Upon determining that the user access level fails to meet or exceed the access level required for the activity, receiving/prompting operation 550 receives or prompts for additional interactions. Additional interactions may include receiving additional voice biometrics from the user, eye movement, or other information that can be used to identify the user. The additional interactions are analyzed in analyzing voice interaction operation 515 and used to determine an updated or new confidence level of the verification of the user's identity.

Figure 6:
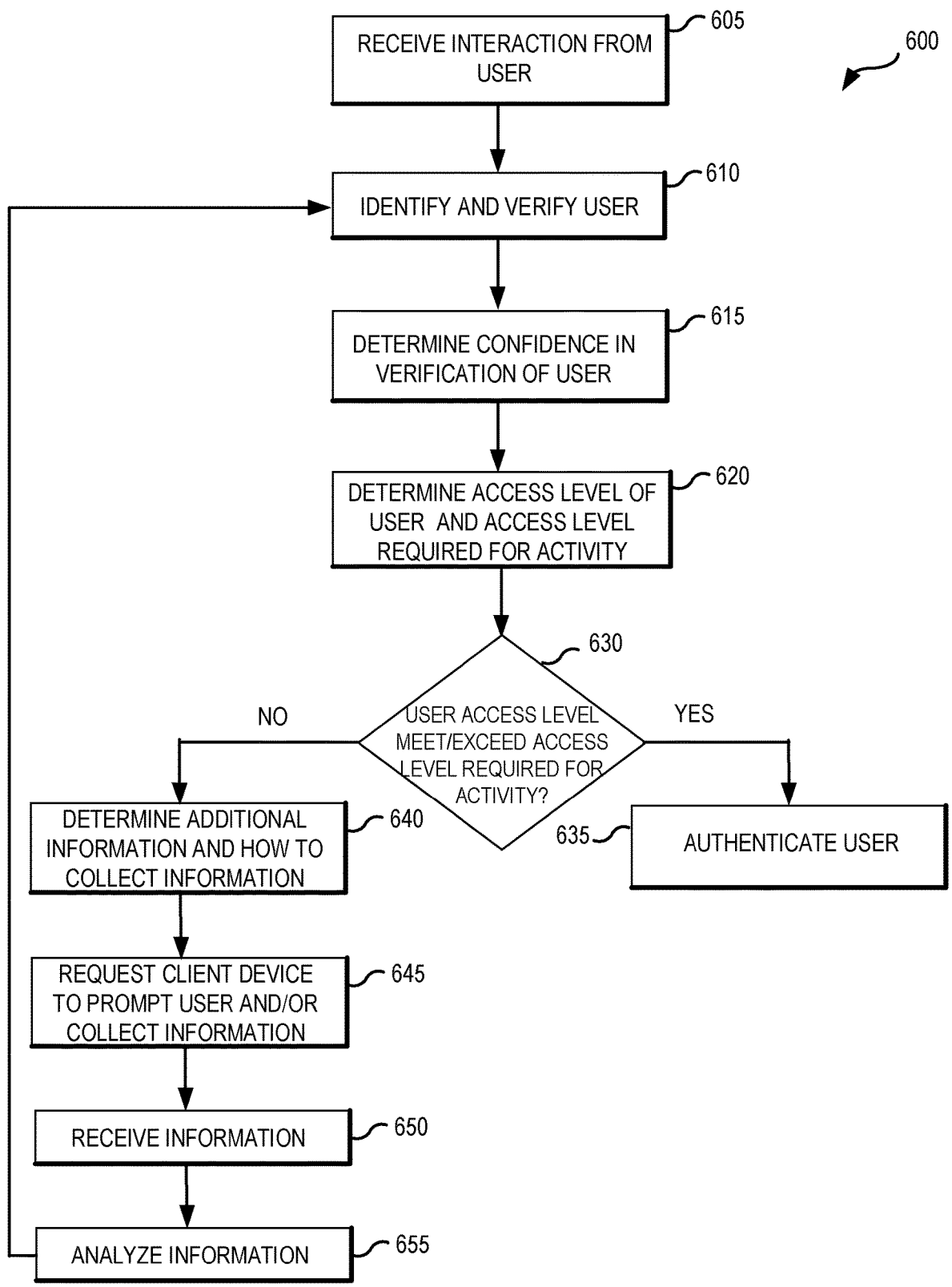
FIG. 6 is a diagram illustrating a process for continuous biometric authentication in accordance with some embodiments of the present disclosure.

FIG. 6 is a diagram illustrating a process for continuous biometric authentication in accordance with some embodiments of the present disclosure. The operations illustrated in FIG. 6 may be performed by one or more components, devices, or modules such as, but not limited to, computing devices 110A-110M, authentication engine 120, processor 210, operating system 215, application 220, biometric information collection module 225, speech to text module 230, communications module 235, GUI generation module 240, processors 310, interaction module 315, identification module 320, biometric information analysis module 325, verification module 330, access level module 335, interaction prompter 340, credential collection module 345, authenticator 350, and GUI generation module 355, or other components or devices. In some embodiments, fewer than all of the steps are performed, whereas in other embodiments additional operations are performed. Moreover, in some embodiments, the operations may be performed in different orders.

Receiving operation 605 receives an interaction from a user. The interaction may be received via a voice call and may identify one or more activities requested by the user (e.g., view an account). Identifying and verifying operation 610 may identify the user (e.g., via a phone number or device fingerprint) and verify the user (e.g., voice analysis). Determining confidence level operation 615 may determine a confidence level in the verification of the user. For example, if the user's voice biometrics match voice biometrics previously generated from the user to a certain threshold, then confidence in the verification of the user's identity may be considered high. Based on the confidence level, an access level of the user may be determined in determining access level operation 620. If the confidence level is high, the access level for the user may high, allowing the user to partake in higher risk activities. Determining access level operation 620 may further determine the access level required for the user to partake in the activity. The access level required the activity may be based on the riskiness of the activity, government regulations, organization rules, etc.

Decision operation 630 determines whether the access level of the user meets or exceeds the access level required for the activity. If the access level of the user meets or exceeds the access level required, the user is authenticated in authenticating operation 635. If the access level of the user does not meet or exceed the access level required for the activity, determining operation 640 determines additional information needed and how to collect the information. Additional information may include a fingerprint, retinal scan, eye movements, device fingerprint, browsing history, etc. Additional information may be collected, and the user may be prompted for the additional information, without the user being aware or burdened by providing additional information. How the information is collected may be based on various considerations such as a type of device used to access the organization (e.g., is the client device capable of capturing a retinal scan?), a time of day (e.g., will the user be at work or at home?), lighting around the user (e.g., is it too dark for a video?), information the organization has stored (e.g., does the organization have enough biometric samples to make a proper comparison?), user preferences (e.g., any particular types of verification that the user indicated as a preferred method?), and others.

Requesting operation 645 requests the client device to prompt the user and/or collect information from the user. This may include asking the user a conversational question, taking a video of the user, gathering device information, etc. Receiving operation 650 receives the information. Analyzing operation 655 analyzes the information. The analysis depends on the type of information received. For example, if biometric information is received, characteristics of the biometric information may be extracted or generated and compared to characteristics that extracted or generated from previously collected biometric samples. The analyzed information may be used to identify and verify the user in identifying and verifying operation 610. The process may continue until access is denied or until the user is authenticated.

Computer System Overview

Figure 7:
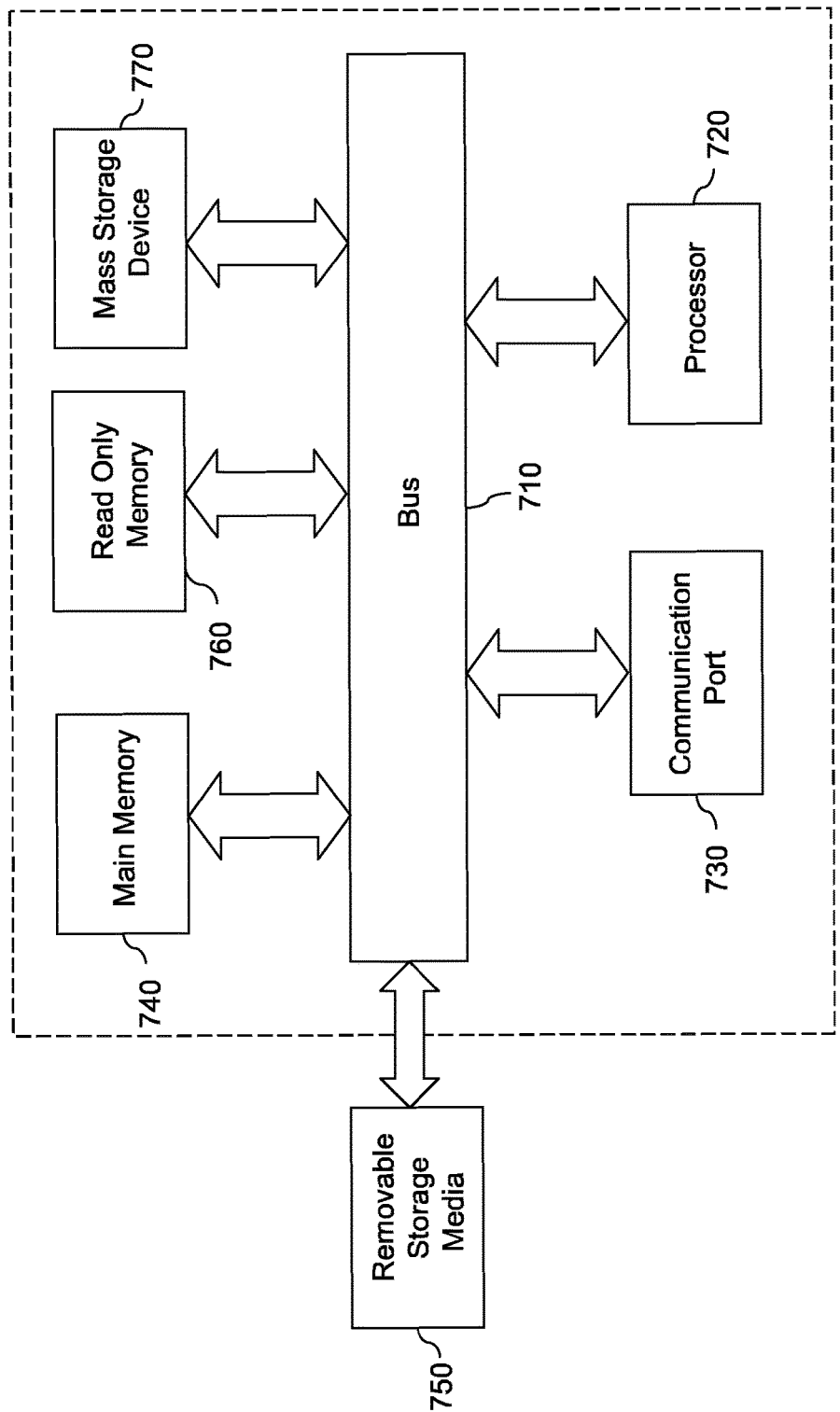
FIG. 7 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present disclosure may be utilized. According to the present example, the computer system 700 includes a bus 710, at least one processor 720, at least one communication port 730, a main memory 740, a removable storage media 750, a read only memory 760, and a mass storage 770.

Processor(s) 720 can be any known processor, such as, but not limited to, an Intel® Itanium® or Itanium 2® processor(s), or AMD® Opteron® or Athlon MP® processor(s), or Motorola® lines of processors. Communication port(s) 630 can be any of an RS-232 port for use with a modem-based dialup connection, a 10/100 Ethernet port, or a Gigabit port using copper or fiber. Communication port(s) 630 may be chosen depending on a network such a Local Area Network (LAN), Wide Area Network (WAN), or any network to which the computer system 700 connects.

Main memory 740 can be Random Access Memory (RAM), or any other dynamic storage device(s) commonly known in the art. Read only memory 760 can be any static storage device(s) such as Programmable Read Only Memory (PROM) chips for storing static information such as instructions for processor 720.

Mass storage 770 can be used to store information and instructions. For example, hard disks such as the Adaptec® family of SCSI drives, an optical disc, an array of disks such as RAID, such as the Adaptec family of RAID drives, or any other mass storage devices may be used.

Bus 710 communicatively couples processor(s) 720 with the other memory, storage, and communication blocks. Bus 710 can be a PCI/PCI-X or SCSI based system bus depending on the storage devices used.

Removable storage media 750 can be any kind of external hard-drives, floppy drives, IOMEGA® Zip Drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for continuously authenticating a user. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computer-implemented method of authenticating a user interacting with an interactive voice response system, comprising:
   receiving biometric information of the user, the received biometric information comprising a spoken request from the user to perform a first activity from among a plurality of activities;
   generating a voice sample of the user based on the spoken request;
   verifying an identity of the user based on the received biometric information and the voice sample of the user, wherein said verifying the identity of the user comprises:
      determining that the identity of the user was previously compromised, and
      responsive to the determination that the identity of the user was previously compromised, modifying a value of a confidence metric associated with the verification relative to a value of the confidence metric prior to the verification, modifying an access level required by the user for the first activity, and maintaining an access level required by the user for a second activity from among the plurality of activities;
   determining an access level of the user based on the modified confidence metric; and
   performing the first activity when the access level based on the modified confidence metric of the user meets or exceeds the modified access level required by the user for the first activity.

2. The method of claim 1, wherein the voice sample of the user is generated further based on spoken information different than the spoken request, and wherein the spoken information that is different than the spoken request comprises a spoken identifier of an account associated with the user.

3. The method of claim 1, wherein said verifying the identity of the user comprises performing a statistical analysis of the voice sample of the user.

4. The method of claim 1, wherein the confidence metric corresponds to an averaging of interactions with the interactive voice response system.

5. The method of claim 1, wherein the received biometric information further comprises at least one non-voice biometric factor.

6. The method of claim 5, wherein the at least one non-voice biometric factor comprises information regarding an eye movement of the user.

7. The method of claim 6, further comprising:
   prompting the user to look at a display element presented on a display device associated with the user, and
   determining the eye movement of the user in response to the prompt of the user to look at the display element.

8. One or more non-transitory computer-readable media including one or more sequences of instructions which, when executed by one or more processors, causes:
   receiving biometric information of a user, the received biometric information comprising a spoken request from the user to perform a first activity from among a plurality of activities;
   generating a voice sample of the user based on the spoken request;
   verifying an identity of the user based on the received biometric information and the voice sample of the user, wherein said verifying the identity of the user comprises:
      determining that the identity of the user was previously compromised, and
      responsive to the determination that the identity of the user was previously compromised, modifying a value of a confidence metric associated with said verifying relative to a value of the confidence metric prior to said verifying, modifying an access level required by the user for the first activity, and maintaining access level required by the user for a second activity from among the plurality of activities;
   determining an access level of the user based on the modified confidence metric; and
   performing the first activity when the access level based on the modified confidence metric of the user meets or exceeds the modified access level required by the user for the first activity.

9. The one or more non-transitory computer-readable media of claim 8, wherein the voice sample of the user is generated further based on spoken information different than the spoken request, and wherein the spoken information that is different than the spoken request comprises a spoken identifier of an account associated with the user.

10. The one or more non-transitory computer-readable media of claim 8, wherein said verifying the identity of the user comprises performing a statistical analysis of the voice sample of the user.

11. The one or more non-transitory computer-readable media of claim 8, wherein the confidence metric corresponds to an averaging of interactions with an interactive voice response system.

12. The one or more non-transitory computer-readable media of claim 8, wherein the received biometric information further comprises at least one non-voice biometric factor.

13. The one or more non-transitory computer-readable media of claim 12, wherein the at least one non-voice biometric factor comprises information regarding an eye movement of the user.

14. The one or more non-transitory computer-readable media of claim 13, further comprising:
   prompting the user to look at a display element presented on a display device associated with the user, and
   determining the eye movement of the user in response to the prompt of the user to look at the display element.

15. A system comprising:
   one or more processors;
   one or more non-transitory computer-readable media including one or more sequences of instructions which, when executed by the one or more processors, causes:
      receiving biometric information of a user, the received biometric information comprising a spoken request from the user to perform a first activity from among a plurality of activities;
      generating a voice sample of the user based on the spoken request;
      verifying an identity of the user based on the received biometric information and the voice sample of the user, wherein said verifying the identity of the user comprises:
         determining that the identity of the user was previously compromised, and
         responsive to the determination that the identity of the user was previously compromised, modifying a value of a confidence metric associated with said verifying relative to a value of the confidence metric prior to said verifying, modifying an access level required by the user for the first activity, and maintaining an access level required by the user for a second activity from among the plurality of activities;

determining an access level of the user based on the modified confidence metric; and performing the first activity when the access level based on the modified confidence metric of the user meets or exceeds the modified access level required by the user for the first activity.

16. The system of claim 15, wherein the voice sample of the user is generated further based on spoken information different than the spoken request, and wherein the spoken information that is different than the spoken request comprises a spoken identifier of an account associated with the user.

17. The system of claim 15, wherein said verifying the identity of the user comprises performing a statistical analysis of the voice sample of the user.

18. The system of claim 15, wherein the confidence metric corresponds to an averaging of interactions with an interactive voice response system.

19. The system of claim 15, wherein the received biometric information further comprises at least one non-voice biometric factor.

20. The system of claim 19, wherein the at least one non-voice biometric factor comprises information regarding an eye movement of the user.

21. The system of claim 20, further comprising:
prompting the user to look at a display element presented on a display device associated with the user, and
determining the eye movement of the user in response to the prompt of the user to look at the display element.

* * * * *

UNITED STATES PATENT AND TRADEMARK OFFICE
CERTIFICATE OF CORRECTION

PATENT NO. : 10,867,021 B1
APPLICATION NO. : 16/549619
DATED : December 15, 2020
INVENTOR(S) : John Shelton et al.

Page 1 of 1

It is certified that error appears in the above-identified patent and that said Letters Patent is hereby corrected as shown below:

In the Claims

Column 20, Line 13, Claim 8, before "access" insert -- an --, therefore.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*